June 3, 1969  L. F. CRAFT ET AL  3,448,034
FLUID STABILIZER
Filed Aug. 24, 1966

INVENTORS
Leonard F. Craft
Frank E. Calvery

BY  Cecil L. Wood

ATTORNEY

United States Patent Office 3,448,034
Patented June 3, 1969

3,448,034
FLUID STABILIZER
Leonard F. Craft, Box 96, Andrews, Tex. 79714, and
Frank E. Calvery, Box 25, Florey, Tex. 79732
Filed Aug. 24, 1966, Ser. No. 574,665
Int. Cl. C23f 13/00
U.S. Cl. 204—197                                3 Claims

ABSTRACT OF THE DISCLOSURE

A stabilizing element having a core comprised of a mixture of several metals which provides a crystalline structure of non-conductive characteristics, and which is substantially non-sacrificing when placed in use. The core is arranged centrally located along the longitudinal central axis of a suitable housing wherein the housing also provides a flow conduit for various liquids.

---

This invention relates to apparatus for stabilizing liquids, such as produced from oil and water wells, or other types of flow tubes, as in steam boilers, and the like, to prevent precipitation of solids contained in the liquids such as calcium sulphate, sodium salts, iron oxide, and other minerals which tend to be deposited as scale to clog and corrode the flow tubes.

In the production of oil the well fluids often contain substantial quantities of corrosive elements which have a destructive effect on the tubing, pump rods, and other equipment in the well. The accumulation of paraffin is detrimental to efficient operation of the pumping equipment and presents the problem of shutting down the production while the operation of removing the paraffin buildup is completed, resulting in loss of production, labor costs, and other expense.

The production and flow of water wells, and the distribution of water therefrom often presents similar problems, especially when the water is laden with undesirable substances, such as calcium sulphate, sodium salts, iron oxide, and other destructive minerals which are injurious to the flow tubes and pumping equipment. In both oil and water wells there exists minerals which are detrimental to the economical production and handling of the liquids which, if retained in suspension, could not precipitate and adhere to the contacted surfaces of the flow lines through which the liquids are passed or the containers into which they are deposited.

While a major problem in the production of oil is the accumulation of paraffin in the flow tubes in the wells, as well as other corrosive substances, water production and distribution also presents problems. Minerals having a variety of characteristics are present in varying quantities to effect depositions of solids in the flow lines, and even destroy them. Calcium sulphate, sodium salts, iron oxide, and the like, being the prime offenders. This factor is particularly detrimental to steam boilers such as those used in laundries and cleaning establishments.

The phenomena which encompasses the invention is not wholly understood but extensive experimentation and tests have definitely proved its utility and effectiveness. Other apparatus have been devised for a like purpose, such as elements composed of copper and zinc, or compositions of so-called dissimilar metals, but such devices have not been proved to be effective for any appreciable periods due to the self-sacrificing character of the elements used. For example, zinc alone, or zinc with copper, will dissipate in relatively short periods and cannot withstand the eroding action of some of the elements suspended in most liquids.

It is important that the metals employed in the composition of the stabilizing element of the invention be of a crystalline structure and have non-conductive characteristics, or at least possess low conductivity to afford the best output of the desired energy and insure against electrolysis in the flow tube, and the rod string, when the latter is used. A constant movement of the liquid in contact with the stabilizing element will produce the best results, and the more rapid the movement less precipitation of the solids in the liquids will occur.

It is also important that the stabilizing element be insulated from outside contacts, such as soil or other influences, which could affect its potentials. It will become apparent that the element is in direct contact, when unitized, with its casing and the entire unit should be out of contact with surrounding metal or soil.

A primary object of the invention is that of providing a metallic rod or core adapted to be enclosed within a flow tube through which liquids can be passed while flowing from a well, or a supply line, and composed of a plurality of crystalline nonferrous metals having a polarizing effect on the liquids to eliminate any affinity between the mineral substances therein and the metallic flow tubes or pump rods through and about which the liquids are caused to flow and thus prevention of precipitation of such minerals in solid form from being deposited on the tubing walls and other surfaces is made possible.

Another object of the invention resides in the provision of a device by which electrolysis in flow tubes, and other equipment exposed to the liquids, can be minimized or completely eliminated to prevent deterioration of such equipment.

Broadly, the invention seeks to comprehend the provision of apparatus by which the solid substances in liquids, such as oil and water, can be stabilized and maintained in a fluid state at all times, and whereby such substances cannot separate and form undesirable deposits and encrustations in the flow tubes and on other contacted surfaces.

While the foregoing objects are paramount, other and lesser objects will become apparent as the description proceeds, when considered in connection with the appended drawings.

The invention primarily consists of a rod or core member 10 which is composed of a plurality of crystalline metals, the preferred composition being substantially as follows:

|  | Percent by weight |
|---|---|
| Copper | 57.64 |
| Zinc | 17.63 |
| Nickel | 13.45 |
| Lead | 7.66 |
| Tin | 2.69 |
| Iron | .69 |
| Antimony | .12 |
| Sulphur | .07 |
| Manganese | .05 |
|  | 100.00 |

Other elements may obviously be substituted for those enumerated with satisfactory results although exhaustive experimentation has proved that the foregoing formula will accomplish the purpose of the invention and provide the necessary elements to carry out its intent. The percentages, of necessity, are approximated since close tolerances are not critical.

The rod or core 10 is preferably cast in any desired lengths, depending upon the use to which it is applied. When installed in an oil well, for example, the length of the rod or core 10 would depend upon the lift, or the depth of the well. Lengths of the element 10 may be from four to eight feet, or a plurality of shorter lengths may be installed. In common flow lines in distribution systems shorter lengths may be employed.

Figure 2:
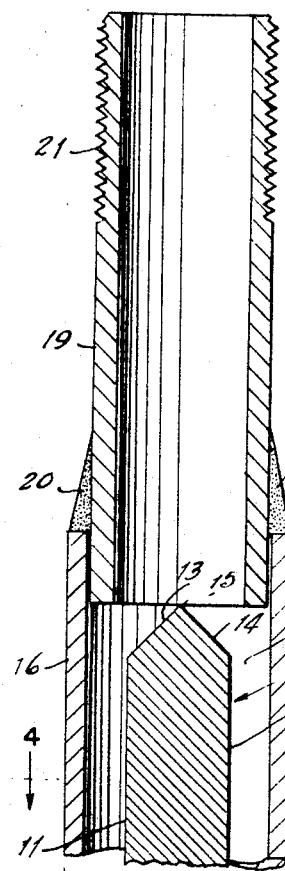
FIGURE 2 is a longitudinal sectional view of the invention, on an enlarged scale, showing the poly-metallic rod or core partially in elevation.
Figure 2:
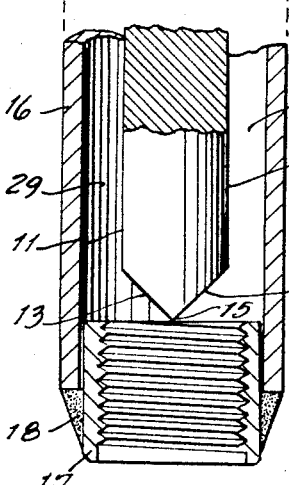
Figure 3:
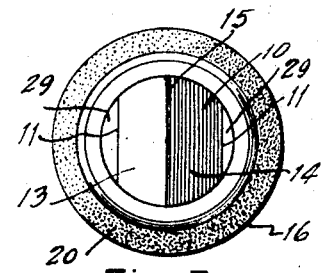
FIGURE 3 is a top plan view of the invention.
Figure 4:
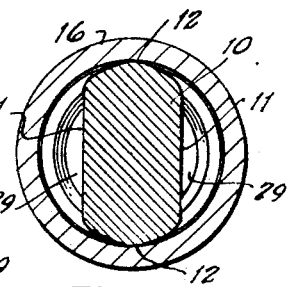
FIGURE 4 is a transverse sectional view, on line 4—4 of FIGURE 2.
Figure 5:
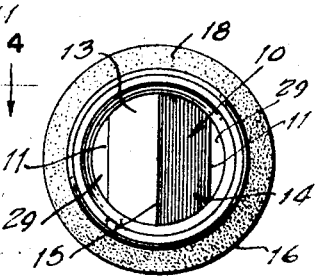
FIGURE 5 is an inverted plan view of the invention.
Figure 6:
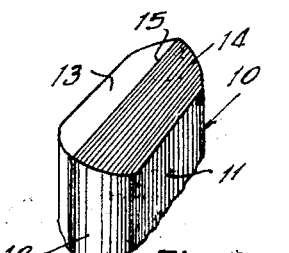
FIGURE 6 is a fragmentary perspective view of the rod or core element.

The member 10 has planar sides 11 and is arcuate at each opposing edge 12, as shown in FIGURES 4 and 6, having its ends chamfered at 13 and 14 to form a peak 15 parallel and intermediate its sides 11. The core 10 is concentrically encased within a tube 16 and impinged at its lower end by an internally threaded sleeve 17 which is concentrically received in the lower end of the tube 16 and integrated circumferentially therewith by a weld 18, as shown in FIGURE 2. The upper end of the core 10 is engaged by a nipple 19, concentrically inserted into the tube 16 and secured by a weld 20. The nipple 19 has external threads 21 at its upper end.

Figure 1:
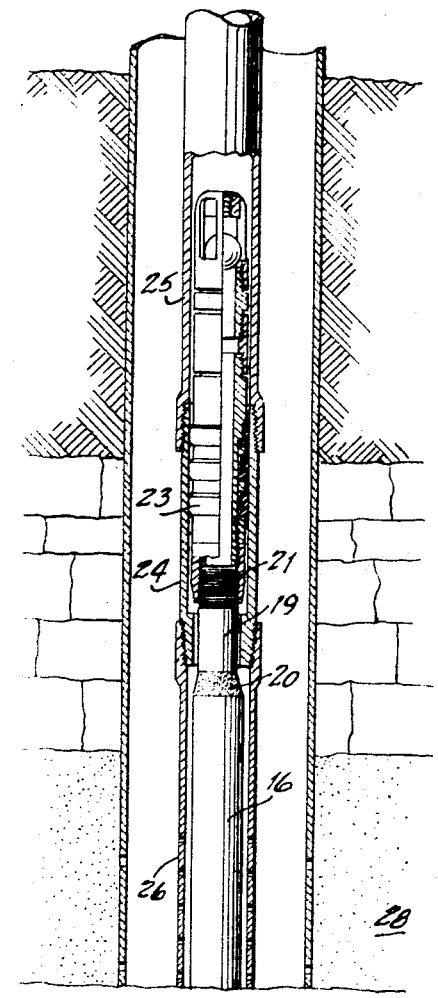
FIGURE 1 is a longitudinal sectional view of the invention installed in a well bore, the well casing, perforated tail pipe and part of the tubing being shown in section.
Figure 1:
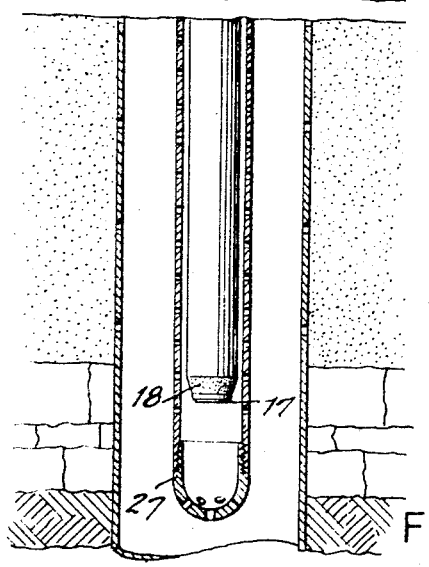

The assembled unit 22, as shown in FIGURE 2, when installed in an oil or water well, is threaded into the lower end of a standing valve 23, or a traveling valve (not shown), as illustrated in FIGURE 1. The installation shown in FIGURE 1 is merely typical and includes a seating nipple 24 connected to the lower end of the flow tube 25. The unit 22 is enclosed within a perforated tube 26 having a bull plug 27 threaded into its lowermost end. Fluid from the producing formation 28 flows into the tube 26 through the perforations therein and up through the tube 16 and the passages 29 therein on each planar side 11 of the core 10 and out through the flow tube 25 past the standing valve 23, or other device, and thence to the surface.

The unit 22 may be installed in a flow line of a distribution system for oil or water in a horizontal position. Ample flow passages 29 are provided in any position of the device. The chamfered surfaces 13 and 14 provide for an unimpeded flow at each end of the element 10, as best shown in FIGURE 2. A strainer (not shown) may be threaded into the internally threaded sleeve 17.

The invention as described is obviously capable of certain changes and modifications, by persons skilled in the art, without departing from the spirit and intent thereof or from the scope of the appended claims.

What is claimed is:
1. Apparatus for stabilizing fluids for connection in a flow line, comprising: a rod composed of approximately 58% copper; 17% zinc; 14% nickel; 7% lead; 3% tin; .69% iron; .12% antimony; .07% sulphur, and .05% manganese, and a cylindrical casing circumferentially surrounding said rod with said rod having surfaces engaging the inner walls thereof and having other surfaces exposed to said fluids in the passage thereof through said casing and capable of polarizing said fluids.

2. A fluid stabilizer as described in claim 1, the said rod containing about 58% copper, 31% comprised of substantially equal quantities of zinc and nickel; 7% lead and 3% tin, and about 1% of a mixture of iron, antimony, sulphur and manganese.

3. A fluid stabilizer for connection in a flow channel comprising: a metal rod composed of about 58% copper; 17% zinc; 14% nickel; 7% lead; 3% tin, and about 1% of a mixture comprised of iron, antimony, sulphur and manganese, a casing embracing said rod and having means for connection in a flow channel, the said rod having at least two surfaces engaging the inner walls of said casing, and other surfaces spaced from said walls and exposed to fluids passing through said casing.

References Cited

UNITED STATES PATENTS

| | | | |
|---|---|---|---|
| 851,159 | 4/1907 | Case | 252—81 |
| 1,608,709 | 11/1926 | Mills | 204—149 |
| 2,392,033 | 1/1946 | Eaton | 204—197 |
| 2,401,546 | 6/1946 | Brown | 204—197 |
| 2,805,988 | 9/1957 | Rader | 204—197 X |
| 2,829,099 | 4/1958 | Marsh | 204—197 |
| 2,846,385 | 8/1958 | Buchan | 204—197 X |
| 3,137,642 | 6/1964 | Johns | 204—148 |

MICHAEL E. ROGERS, *Primary Examiner.*

U.S. Cl. X.R.

23—252; 166—41; 204—148, 150, 248, 293; 210—57; 252—81